(12) United States Patent
Park

(10) Patent No.: US 12,722,632 B2
(45) Date of Patent: Sep. 1, 2026

(54) VEHICLE PLATOONING CONTROL APPARATUS THAT OPERATES A VEHICLE USING TARGET SPEED AND SEPARATION DISTANCE SET BASED ON DRIVING SPEED-BASED FUEL EFFICIENCY DATA

(71) Applicant: HYUNDAI MOBIS CO., LTD., Seoul (KR)

(72) Inventor: Seung Jin Park, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/356,789

(22) Filed: Jun. 24, 2021

(65) Prior Publication Data

US 2022/0001865 A1 Jan. 6, 2022

(30) Foreign Application Priority Data

Jul. 6, 2020 (KR) ........................ 10-2020-0083142

(51) Int. Cl.

*B60W 10/18* (2012.01)
*B60W 30/09* (2012.01)
(Continued)

(52) U.S. Cl.

CPC .......... *B60W 30/143* (2013.01); *B60W 30/09* (2013.01); *B60W 30/165* (2013.01); (Continued)

(58) Field of Classification Search

CPC ........... B60W 30/143; B60W 2556/65; B60W 2552/15; B60W 60/0023; B60W 30/09; B60W 30/165; B60W 40/076; G08G 1/22
See application file for complete search history.

(56) References Cited

U.S. PATENT DOCUMENTS

2002/0069010 A1* 6/2002 Nishira ................. B60W 30/16 701/96
2010/0268432 A1* 10/2010 Arai .................... B60W 40/072 701/96
(Continued)

FOREIGN PATENT DOCUMENTS

CN 1616283 A 5/2005
CN 110001617 A 7/2019
(Continued)

OTHER PUBLICATIONS

Lammer et al., "Effect of Platooning on Fuel Consumption of Class 8 Vehicles Over a Range of Speeds, Following Distances, and Mass", Oct. 7, 2014, SAE International (Year: 2014).*
(Continued)

*Primary Examiner* — Scott A Browne
*Assistant Examiner* — Rami Nabih Bedewi
(74) *Attorney, Agent, or Firm* — NSIP Law

(57) ABSTRACT

Disclosed is a vehicle platooning control apparatus including a vehicle speed setter configured to set a target speed of a platooning group based on driving-speed-based fuel economy data of a vehicle included in the platooning group, a distance setter configured to set a separation distance between the vehicle and a preceding vehicle based on the target speed set by the vehicle speed setter, and a driving controller configured to control driving of the vehicle based on the target speed set by the vehicle speed setter or the separation distance set by the distance setter.

6 Claims, 8 Drawing Sheets

(51) Int. Cl.

| | |
|---|---|
| ***B60W 30/14*** | (2006.01) |
| ***B60W 30/165*** | (2020.01) |
| ***B60W 40/076*** | (2012.01) |
| ***B60W 40/105*** | (2012.01) |
| ***B60W 60/00*** | (2020.01) |
| ***G05D 1/02*** | (2020.01) |
| ***G08G 1/00*** | (2006.01) |

(52) U.S. Cl.

CPC ...... *B60W 40/076* (2013.01); *B60W 60/0023* (2020.02); *G08G 1/22* (2013.01); *B60W 2552/15* (2020.02); *B60W 2556/65* (2020.02)

(56) References Cited

U.S. PATENT DOCUMENTS

| | | | | |
|---|---|---|---|---|
| 2017/0008525 | A1* | 1/2017 | Ko | B60W 40/076 |
| 2018/0001764 | A1* | 1/2018 | Bang | B60W 30/16 |
| 2018/0001892 | A1* | 1/2018 | Kim | B60W 30/16 |
| 2018/0356835 | A1* | 12/2018 | Gehring | G05D 1/0217 |
| 2018/0366005 | A1* | 12/2018 | Seenumani | B61L 15/0027 |
| 2019/0196501 | A1 | 6/2019 | Lesher et al. | |
| 2019/0204828 | A1 | 7/2019 | Ishikawa et al. | |
| 2019/0206261 | A1 | 7/2019 | Szymczak et al. | |
| 2019/0232962 | A1 | 8/2019 | Broll et al. | |
| 2020/0070828 | A1* | 3/2020 | Okuda | B60W 40/04 |
| 2020/0122724 | A1 | 4/2020 | Hiramatsu | |
| 2021/0001851 | A1* | 1/2021 | Pan | B60W 30/16 |
| 2021/0070292 | A1* | 3/2021 | Jornod | B60W 30/162 |
| 2021/0172749 | A1* | 6/2021 | Shin | G01C 21/3841 |
| 2022/0340135 | A1* | 10/2022 | Ohsawa | B60W 30/165 |

FOREIGN PATENT DOCUMENTS

| | | | | |
|---|---|---|---|---|
| CN | 110382319 | A | 10/2019 | |
| CN | 111316183 | A | 6/2020 | |
| CN | 111356618 | A | 6/2020 | |
| EP | 3 394 843 | B1 | 10/2018 | |
| EP | 3316064 | B1 * | 9/2019 | B60W 30/16 |
| EP | 3 790 295 | A1 | 3/2021 | |
| GB | 2572210 | A | 9/2019 | |
| KR | 2001-0077768 | A | 8/2001 | |
| KR | 10-2016-0033513 | A | 3/2016 | |
| KR | 10-2017-0034696 | A | 3/2017 | |
| SE | 539 521 | C2 | 10/2017 | |
| WO | WO 2013/006826 | A2 | 1/2013 | |
| WO | WO 2015/047177 | A1 | 4/2015 | |

OTHER PUBLICATIONS

"Effect of Platooning on Fuel Consumption of Class 8 Vehicles Over a Range of Speeds, Following Distances, and Mass"—Lammer et al., Oct. 7, 2014, SAE International (Year: 2014).*

Machine Translation—EP 3316064 B1—Huber et al. (Year: 2017).*

Machine Translation of Foreign Patent: EP3316064B1—Huber et al. (Year: 2017).*

Extended European Search Report Issued on Nov. 15, 2021 in counterpart European Patent Application No. 21183215.9 (8 pages in English).

European Office Action issued on Aug. 19, 2022, in counterpart European Patent Application No. 21183215.9 (7 pages in English).

European Office Action issued on Feb. 22, 2023, in counterpart European Patent Application No. 21183215.9 (6 pages in English).

Chinese Office Action Issued on Mar. 18, 2023, in Counterpart Chinese Patent Application No. 202110758968.0 (9 Pages in Chinese).

Korean Office Action issued on Jul. 2, 2025, in counterpart Korean Patent Application No. 10-2020-0083142(7 pages in English, 6 pages in Korean).

* cited by examiner

VEHICLE PLATOONING CONTROL APPARATUS THAT OPERATES A VEHICLE USING TARGET SPEED AND SEPARATION DISTANCE SET BASED ON DRIVING SPEED-BASED FUEL EFFICIENCY DATA

CROSS-REFERENCE TO RELATED APPLICATION

This application claims the benefit under 35 U.S.C. § 119 (a) of Korean Patent Application No. 10-2020-0083142, filed on Jul. 6, 2020, with the Korean Intellectual Property Office, the disclosure of which is incorporated herein by reference for all purposes.

BACKGROUND

1. Field

The following description relates to a vehicle platooning control system and method, and more particularly to control for improving fuel economy in platooning.

2. Description of Related Art

In order to improve safety and convenience of users who use vehicles, technology for grafting various sensors and electronic devices to the vehicles has been increasingly developed. In particular, each vehicle is equipped with a system that provides various functions (e.g. smart cruise control and lane keeping assistance) developed in order to improve driving convenience of the users. As a result, self-driving of a vehicle on a road in consideration of an external environment without driver manipulation, i.e. autonomous driving, has been developed stepwise.

Platooning, which is a kind of autonomous driving, means autonomous driving of a plurality of vehicles included in a platooning group on a road while sharing driving information in consideration of an external environment.

In particular, a platooning group includes a leader vehicle and a follower vehicle. The leader vehicle is a vehicle that leads the platooning group at the forefront thereof, and the follower vehicle is a vehicle that follows the leader vehicle.

In platooning, a leader vehicle and a plurality of follower vehicles guided by the leader vehicle communicate with each other in the state in which the distance between the vehicles is controlled. In order to achieve individual autonomous driving, each vehicle included in a platooning group is generally provided with a plurality of sensors.

The matters disclosed in this section are merely for enhancement of understanding of the general background of the invention and should not be taken as an acknowledgment or any form of suggestion that the matters form the related art already known to a person skilled in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, there is provided a vehicle platooning control apparatus including a vehicle speed setter configured to set a target speed of a platooning group based on driving-speed-based fuel economy data of a vehicle included in the platooning group, a distance setter configured to set a separation distance between the vehicle and a preceding vehicle based on the target speed set by the vehicle speed setter, and a driving controller configured to control driving of the vehicle based on the target speed set by the vehicle speed setter or the separation distance set by the distance setter.

The vehicle speed setter may be configured to set a driving speed of the platooning group having a maximum fuel economy as the target speed of the platooning group.

The vehicle platooning control apparatus may include a monitor configured to monitor driving data of the vehicle and to generate the driving-speed-based fuel economy data based on the monitored driving data.

The distance setter may be configured to set the separation distance based on a speed profile of each vehicle included in the platooning group driven at the target speed and a respective preceding vehicle of the each vehicle at a time of abrupt braking.

The distance setter may be configured to set a distance interval including the separation distance in an extended state based on a gradient of a road on which the platooning group or the vehicle is driven, and the driving controller may be configured to control driving of the vehicle based on the distance interval set by the distance setter.

The driving controller may be configured to control driving of the vehicle based on the driving-speed-based fuel economy data of the vehicle while maintaining the distance from the preceding vehicle within the distance interval.

The distance setter may be configured to set the distance interval as an interval equal to or greater than the separation distance and equal to or less than a product of the separation distance and a preset factor.

The preset factor may be configured to increase, in response to an increase in the gradient of the road on which the platooning group or the vehicle is driven.

The vehicle platooning control apparatus may include a braking strategy setter configured to set a speed profile of the vehicle based on a target deceleration at a time of abrupt braking as braking strategy.

The braking strategy setter may be configured to calculate compensated deceleration in which a gradient of a road on which the platooning group or the vehicle is driven may be reflected as target deceleration, and to set a speed profile based on the compensated deceleration as braking strategy.

In another general aspect, there is provided a processor-implemented vehicle platooning control method including setting a target speed of a platooning group based on driving-speed-based fuel economy data of a vehicle included in the platooning group, setting a separation distance between the vehicle and a preceding vehicle based on the target speed, and controlling driving of the vehicle based on the target speed or the separation distance.

The setting the target speed of the platooning group may include setting the target speed based on a driving speed of the platooning group having a maximum fuel economy being set as the target speed of the platooning group.

The vehicle platooning control method may include monitoring driving data of the vehicle and generating the driving-speed-based fuel economy data based on the monitored driving data.

The setting of the separation distance from the preceding vehicle may include setting the separation distance based on a speed profile of each vehicle included in the platooning group driven at the target speed and a respective preceding vehicle of the each vehicle at a time of abrupt braking.

The setting of the separation distance from the preceding vehicle may include setting a distance interval including the separation distance in an extended state based on a gradient of a road on which the platooning group or the vehicle is driven, and the controlling of the driving of the vehicle may include driving the vehicle based on the distance interval.

The controlling of the driving of the vehicle may include controlling the driving of the vehicle based on the driving-speed-based fuel economy data of the vehicle while the distance from the preceding vehicle may be maintained within the distance interval.

The setting of the separation distance from the preceding vehicle may include setting the distance interval as an interval equal to or greater than the separation distance and equal to or less than a product of the separation distance and a preset factor.

The preset factor may be configured to increase, in response to an increase in the gradient of the road on which the platooning group or the vehicle is driven.

The vehicle platooning control method may include setting a speed profile of the vehicle based on a target deceleration at a time of abrupt braking as braking strategy, and wherein the controlling of the driving of the vehicle may include controlling of the driving of the vehicle based on the braking strategy.

The braking strategy may include reflecting compensated deceleration based on a gradient of a road on which the platooning group or the vehicle is driven in the target deceleration, and setting a speed profile based on the compensated deceleration as the braking strategy.

Other features and aspects will be apparent from the following detailed description, the drawings, and the claims.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
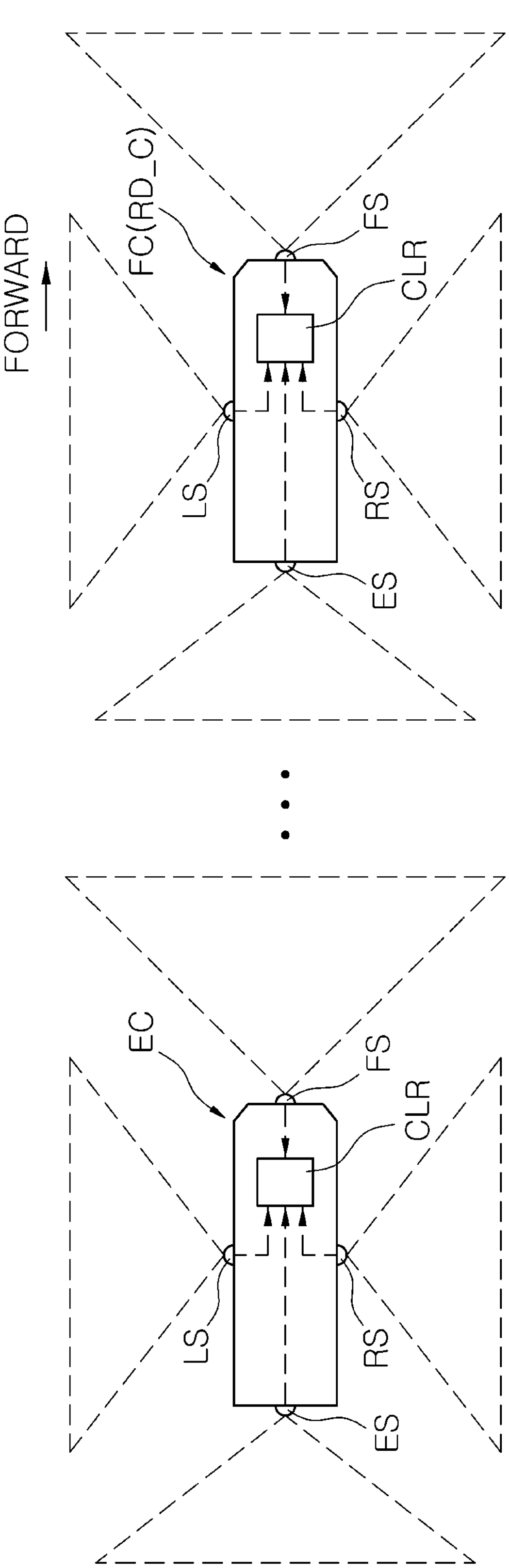
FIG. 1 is a view showing platooning vehicles to which a vehicle platooning control system according to an embodiment of the present invention is applicable.

Specific structural or functional descriptions of the embodiments of the present invention disclosed in this specification or this disclosure are given only for illustrating embodiments of the present invention. Embodiments of the present invention may be realized in various forms, and should not be interpreted to be limited to the embodiments of the present invention disclosed in this specification or this disclosure.

Since the embodiments of the present invention may be variously modified and may have various forms, specific embodiments will be shown in the drawings and will be described in detail in this specification or this disclosure. However, the embodiments according to the concept of the present invention are not limited to such specific embodiments, and it should be understood that the present invention includes all alterations, equivalents, and substitutes that fall within the idea and technical scope of the present invention.

It will be understood that, although the terms “first”, “second”, etc. may be used herein to describe various elements, corresponding elements should not be understood to be limited by these terms, which are used only to distinguish one element from another. For example, within the scope defined by the present invention, a first element may be referred to as a second element, and similarly, a second element may be referred to as a first element.

It will be understood that, when a component is referred to as being “connected to” or “coupled to” another component, it may be directly connected to or coupled to the other component, or intervening components may be present. In contrast, when a component is referred to as being “directly connected to” or “directly coupled to” another component, there are no intervening components present. Other terms that describe the relationship between components, such as “between” and “directly between” or “adjacent to” and “directly adjacent to”, must be interpreted in the same manner.

The terms used in this specification are provided only to explain specific embodiments, but are not intended to restrict the present invention. A singular representation may include a plural representation unless it represents a definitely different meaning from the context. It will be further understood that the terms “comprises”, “has” and the like, when used in this specification, specify the presence of stated features, numbers, steps, operations, elements, components or combinations thereof, but do not preclude the presence or addition of one or more other features, numbers, steps, operations, elements, components, or combinations thereof.

Unless otherwise defined, all terms, including technical and scientific terms, used in this specification have the same meanings as those commonly understood by a person having ordinary skill in the art to which the present invention pertains. It will be further understood that terms, such as those defined in commonly used dictionaries, should be interpreted as having meanings consistent with their meanings in the context of the may relevant art and the present disclosure, and are not to be interpreted in an idealized or overly formal sense unless expressly so defined herein.

Hereinafter, preferred embodiments of the present invention will be described in detail with reference to the accompanying drawings. The same reference numerals presented in the respective drawings denote the same members.

FIG. 1 is a view showing platooning vehicles to which a vehicle platooning control system according to an embodiment of the present invention is applicable.

Referring to FIG. 1, a plurality of vehicles ranging from the forefront vehicle FC to the rearmost vehicle EC sequentially drives in a line. Each vehicle is provided with a plurality of sensors and a controller CLR configured to recognize various obstacles around the vehicle and to control the vehicle based on signals from the sensors. The controllers CLR of the vehicles share necessary data through communication therebetween and transmit commands according to a predetermined command system such that the vehicles move to a destination through continuous platooning.

For reference, each vehicle is shown as including a front sensor FS, a left sensor LS, a right sensor RS, and a rear sensor ES in FIG. 1. However, an actual vehicle may be provided with a larger or smaller number of sensors.

In addition, the forefront vehicle FC is a leader vehicle RD_C, which serves to lead the platooning vehicles at the forefront of platooning vehicles.

Figure 2:
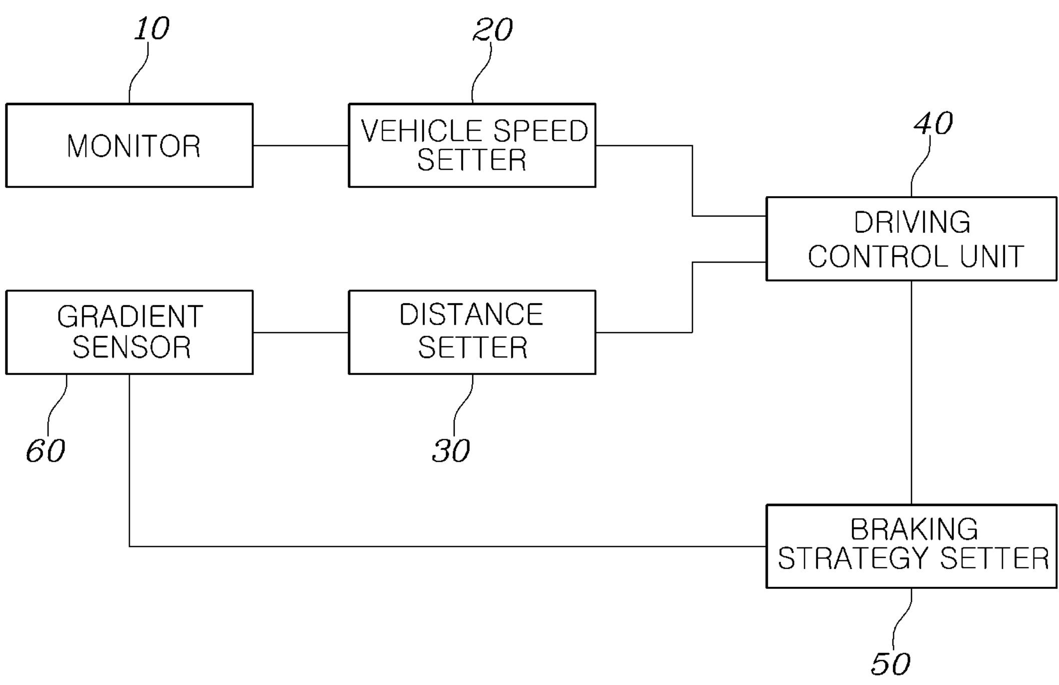
FIG. 2 is a view showing the construction of a vehicle platooning control system according to an embodiment of the present invention.
Figure 3C:
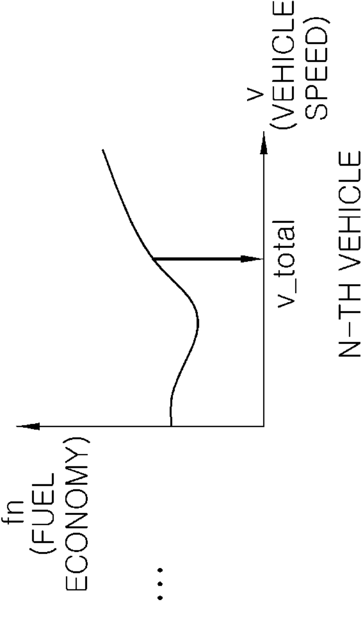
FIGS. 3A-3C are views showing driving-speed-based fuel economy data of each vehicle according to an embodiment of the present invention.
Figure 3B:
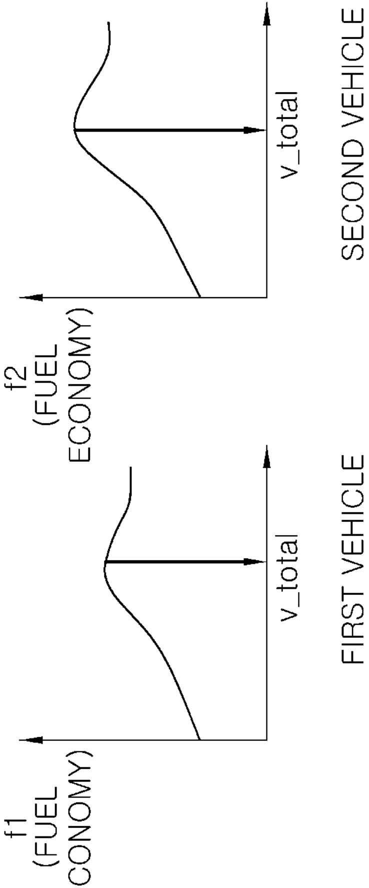
Figure 3A:
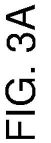
Figure 4:
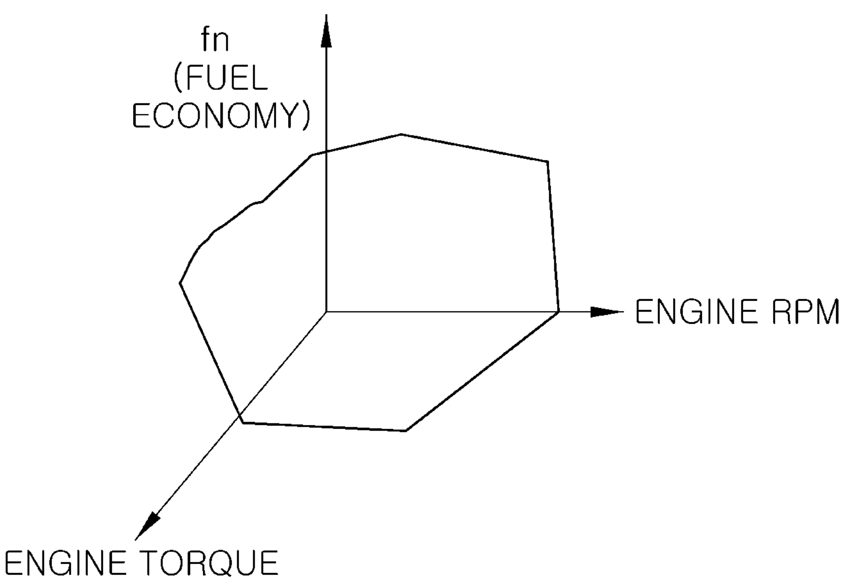
FIG. 4 is a view showing fuel economy data based on rotational speed and torque of an engine according to an embodiment of the present invention.

FIG. 2 is a view showing the construction of a vehicle platooning control system according to an embodiment of the present invention, FIGS. 3A-3C are views showing driving-speed-based fuel economy data of each vehicle according to an embodiment of the present invention, and FIG. 4 is a view showing fuel economy data based on rotational speed and torque of an engine according to an embodiment of the present invention.

Referring to FIGS. 2 to 4, the vehicle platooning control system according to the embodiment of the present invention includes a vehicle speed setter 20 configured to set a target speed of a platooning group based on driving-speed-based fuel economy data of vehicles included in the platooning group, a distance setter 30 configured to set the separation distance between the preceding vehicle and the vehicle included in the platooning group based on the target speed set by the vehicle speed setter 20, and a driving controller 40 configured to control driving of the vehicles included in the platooning group based on the target speed set by the vehicle speed setter 20 or the separation distance set by the distance setter 30.

The vehicle speed setter 20, the distance setter 30, the driving controller 40, a monitor 10, and a braking strategy setter 50 according to an exemplary embodiment of the present invention may be implemented by an algorithm configured to control the operation of various components of a vehicle, a non-volatile memory (not shown) configured to store data on software commands that reproduce the algorithm, or a processor (not shown) configured to perform the following operation using the data stored in the memory. Here, the memory and the processor may be implemented as individual chips. Alternatively, the memory and the processor may be implemented as an integrated chip. One or more processors may be provided.

The vehicle speed setter 20 may set the driving speed of the platooning group having the maximum fuel economy as the target speed of the platooning group using driving-speed-based fuel economy data of the vehicles included in the platooning group.

Specifically, the vehicle speed setter 20 may set the target speed of the platooning group, which is the speed at which the vehicles included in the platooning group are driven, using fuel economy data.

More specifically, as shown in FIGS. 3A-3C, the vehicle speed setter 20 may set the target speed of the platooning group using fuel economy data of all vehicles 1 to n or a plurality of vehicles included in the platooning group. As an embodiment, the vehicle speed setter may sum a plurality of collected fuel economy data, and may set the driving speed having the maximum fuel economy as the target speed.

That is, v at which f_total(v) is minimized through the following equation may be set as the target speed v_total.

$$f\_total(v)=f1(v)+f2(v)+f3(v)\ldots fn(v)$$

As another embodiment, in the case in which there is present a speed section set by a user or a driver or in the case in which a road on which the vehicles are driven has a predetermined speed limit, the driving speed having the maximum fuel economy within the set speed section or the range of the speed limit may be set as the target speed.

In addition, as shown in FIG. 4, fuel economy data of each vehicle may be fuel economy data based on rotational speed and torque of an engine.

In particular, not only the rotational speed of the engine or the driving speed of the vehicle but also the torque of the engine may affect fuel economy depending on the gradient of a road or the surface state of the road, as will be described below.

Consequently, the fuel economy data of the vehicle may be a fuel economy table or graph based on rotational speed and torque of the engine.

Although the engine is described, the above description may be equally applicable to a driving motor configured to transmit driving force to the vehicle excluding the engine.

The distance setter 30 may set the distance from the preceding vehicle based on the set target speed. The preceding vehicle may be a vehicle included in the platooning group. In the case in which the preceding vehicle is a leader vehicle of the platooning group, the preceding vehicle may be a vehicle that is not included in the platooning group.

As an embodiment, the distance setter 30 may set the distance from the preceding vehicle so as to be increased as the target speed is increased, or may set the distance from the preceding vehicle so as to be decreased as the target speed is decreased.

The driving controller 40 may control driving of the vehicle included in the platooning group, and, particularly, may control the driving speed of the vehicle. Specifically, the driving controller 40 may perform control so as to follow the target speed set by the vehicle speed setter 20 or to maintain the distance from the preceding vehicle set by the distance setter 30.

The driving controller 40 may control various sensors, a driving device, and a steering device of the vehicle included in the platooning group or may control driving of a leader vehicle or a tail vehicle included in the platooning group, thereby controlling autonomous driving of the platooning group.

In the case in which the vehicles included in the platooning group are driven so as to follow the target speed on a general flatland, the distance from the preceding vehicle may be maintained.

A monitor 10 configured to monitor driving data of the vehicle included in the platooning group and to generate driving-speed-based fuel economy data based on the monitored driving data may be further included.

The monitor 10 may continuously store driving data of each vehicle included in the platooning group. The monitor 10 may generate a speed-fuel economy table or graph using pre-stored driving data.

As another embodiment, fuel economy data provided by a manufacturer may be pre-stored in each vehicle.

Figure 5:
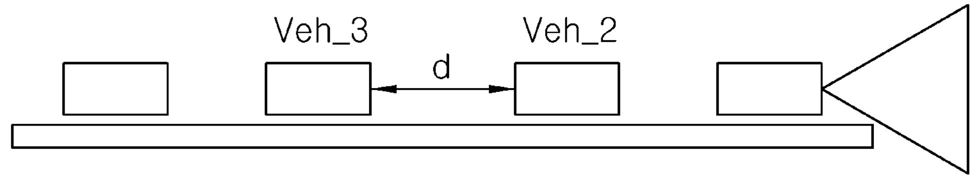
FIG. 5 is a view showing platooning on a flatland according to an embodiment of the present invention.
Figure 6A:
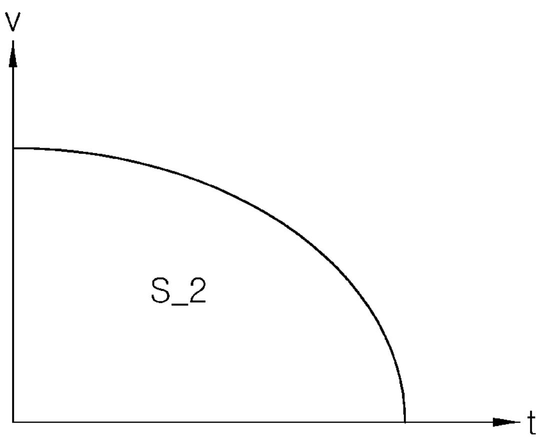
FIGS. 6A-6C are views showing speed profiles of vehicles included in a platooning group according to an embodiment of the present invention at the time of abrupt braking.
Figure 6B:
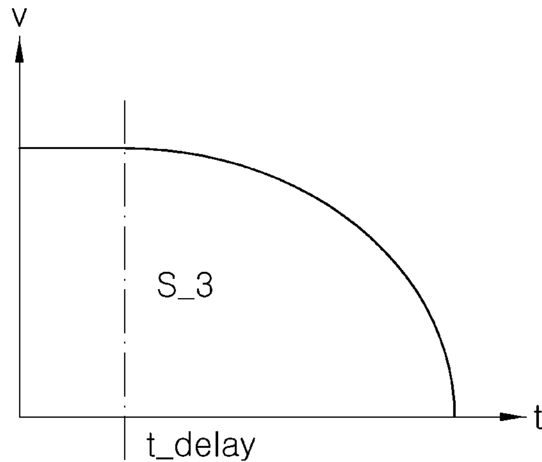
Figure 6C:
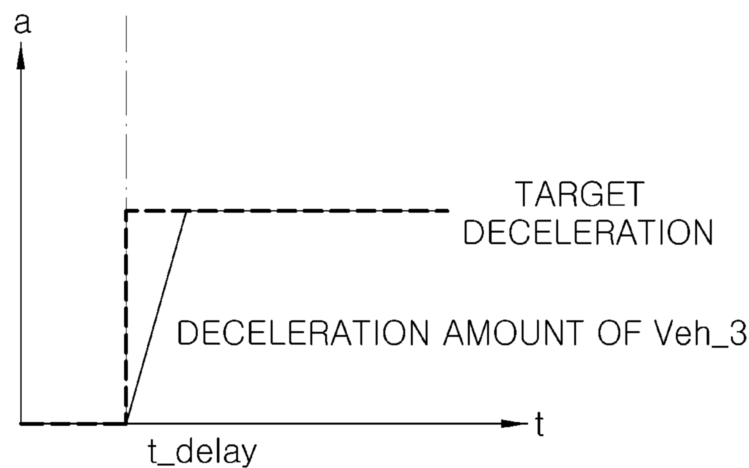

FIG. 5 is a view showing platooning on a flatland according to an embodiment of the present invention, and FIGS. 6A-6C are views showing speed profiles of vehicles included in a platooning group according to an embodiment of the present invention at the time of abrupt braking.

Referring to FIGS. 5 and 6A-6C, the distance setter 30 may set a separation distance d based on speed profiles of a vehicle Veh_3 included in the platooning group driven at the target speed and a preceding vehicle Veh_2 at the time of abrupt braking.

FIG. 6A shows the speed profile of the preceding vehicle Veh_2 over time at the time of abrupt braking, wherein S_2 is an integrated value of the speed profile over time, which may be the stopping distance of the preceding vehicle Veh_2. In addition, FIG. 6B shows the speed profile of the vehicle Veh_3 included in the platooning group over time at the time of abrupt braking, wherein S_3 is an integrated value of the speed profile over time, which may be the stopping distance of the vehicle Veh_3 included in the platooning group.

In particular, the speed profile of the follower vehicle over time may be determined such that the speed profile of the vehicle Veh_3 included in the platooning group over time at the time of abrupt braking is delayed by a predetermined time t_delay from the speed profile of the preceding vehicle Veh_2 over time at the time of abrupt braking.

Here, the delay time t_delay at the point in braking time may be preset as a fixed value or may be set based on the distance d between the preceding vehicle and the follower vehicle and the driving speed of the vehicle Veh_3 included in the platooning group.

In addition, the speed profile of each of the preceding vehicle Veh_2 and the vehicle Veh_3 included in the platooning group over time at the time of abrupt braking may be set as a speed profile following predetermined target deceleration (FIG. 6C).

The distance setter 30 may set the distance d between the preceding vehicle Veh_2 and the vehicle Veh_3 included in the platooning group as the following equation in consideration of the stopping distance S_2 of the preceding vehicle Veh_2 and the stopping distance S_3 of the vehicle Veh_3 included in the platooning group.

$$d \geq S\_3 - S\_2 + \alpha$$

Here, α indicates a tuning parameter.

The distance setter 30 may set a distance interval including the separation distance in an extended state based on the gradient of the road on which the platooning group or the vehicle included in the platooning group is driven, and the driving controller 40 may control driving of the vehicle included in the platooning group based on the distance interval set by the distance setter 30.

As another embodiment, the distance setter 30 may set the separation distance d such that the target deceleration of the vehicle Veh_3 included in the platooning group over time at the time of abrupt braking is equal to or less than a predetermined magnitude.

Figure 7:
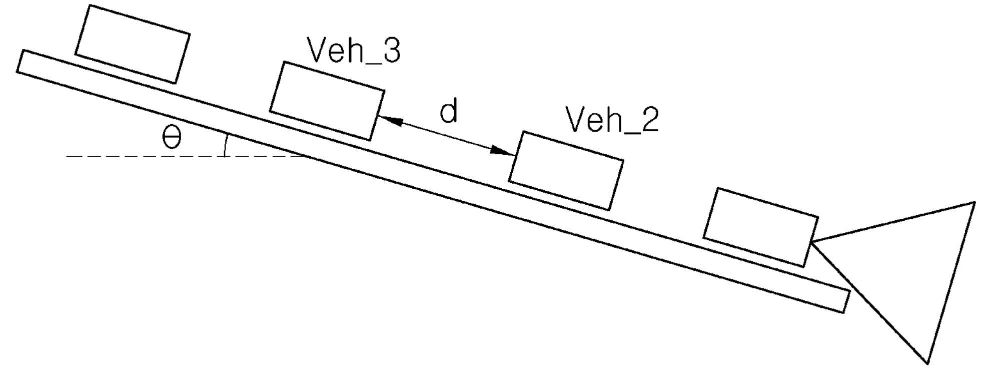
FIG. 7 is a view showing platooning on a sloped road according to an embodiment of the present invention.
Figure 8A:
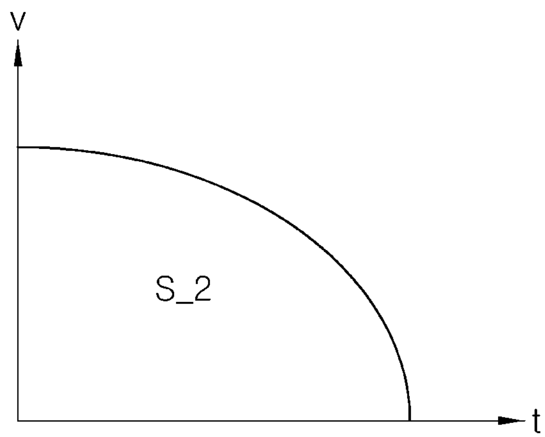
FIGS. 8A-8C are views showing speed profiles of vehicles included in a platooning group according to an embodiment of the present invention at the time of abrupt braking.
Figure 8B:
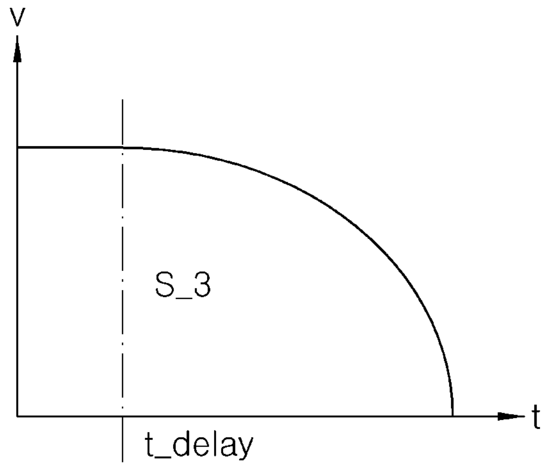
Figure 8C:
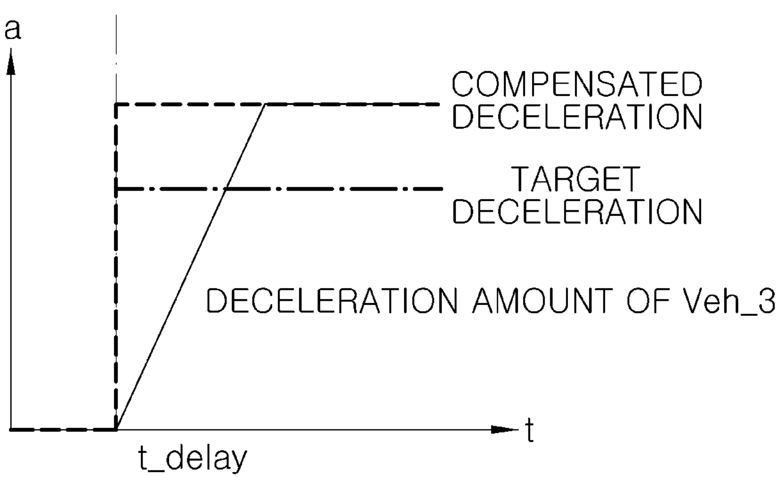

FIG. 7 is a view showing platooning on a sloped road according to an embodiment of the present invention, and FIGS. 8A-8C are views showing speed profiles of vehicles included in a platooning group according to an embodiment of the present invention at the time of abrupt braking.

FIG. 8A shows the speed profile of the preceding vehicle Veh_2 over time at the time of abrupt braking, wherein S_2 is an integrated value of the speed profile over time, which may be the stopping distance of the preceding vehicle Veh_2. In addition, FIG. 8B shows the speed profile of the vehicle Veh_3 included in the platooning group over time at the time of abrupt braking, wherein S_3 is an integrated value of the speed profile over time, which may be the stopping distance of the vehicle Veh_3 included in the platooning group.

In addition, the speed profile of each of the preceding vehicle Veh_2 and the vehicle Veh_3 included in the platooning group over time at the time of abrupt braking may be set as a speed profile following compensated deceleration, a description of which will follow (FIG. 8C).

Referring to FIGS. 7 and 8A-8C, the distance setter 30 may set a distance interval including the separation distance in an extended state based on the gradient of the road on which the platooning group or the vehicle included in the platooning group is driven, and the driving controller 40 may control driving of the vehicle included in the platooning group based on the distance interval set by the distance setter 30.

As an embodiment, the distance setter 30 may be connected to a gradient sensor 60 so as to receive the gradient of the road sensed by the gradient sensor 60. For example, the gradient sensor 60 may be an acceleration sensor, an attitude sensor, or a pitch sensor mounted to a vehicle to sense the rotational angle of the vehicle rotated in a pitch direction.

As another embodiment, the distance setter 30 may receive the gradient of the road using navigation information, or may be connected to an atmosphere sensor provided in the vehicle to estimate the gradient of the road based on a change in atmospheric pressure sensed by the atmosphere sensor and the speed of the vehicle. More specifically, the gradient of the road may be estimated using the gravity-direction speed of the vehicle at which the vehicle moves in a gravity direction based on a change in the sensed atmospheric pressure and the speed of the vehicle.

As another embodiment, the gradient of the road may be estimated using acceleration or deceleration driving data of the vehicle.

Specifically, the gradient of the road may be estimated using driving force generated by the driving device of the vehicle or braking force generated by a braking device and acceleration or deceleration data including the acceleration amount or the deceleration amount of the vehicle.

For example, an equation of estimating the gradient of the road using accelerator position sensor (APS) opening, brake position sensor opening, and acceleration of the vehicle may be pre-stored, and a gradient estimation unit (not shown) may estimate the gradient of the road by applying acceleration or deceleration data to the pre-stored equation.

As another embodiment, the gradient of the road ahead of the vehicle may be estimated using an image of the front of the vehicle captured by a camera sensor provided in the vehicle.

As an embodiment, in the case in which the gradient of the road is equal to or greater than a predetermined gradient, the distance setter 30 may set a distance interval including the separation distance in an extended state.

As another embodiment, the distance setter 30 may set the magnitude of the distance interval based on the gradient of the road.

The distance setter 30 may set the distance interval based on the gradient of the road, and may set the distance interval as an interval equal to or greater than a set distance. That is, the distance setter 30 may set the distance interval so as to be equal to or greater than a distance at which safety is guaranteed at the time of abrupt braking depending on the driving speed.

In particular, the distance setter 30 may set the distance interval d_interval as an interval having the set separation distance d or more and equal to or less than the product of the separation distance d and a preset factor w. That is, the distance interval may be set according to the following equation.

$$d \geq d\_interval \geq d*w$$

As an embodiment, the preset factor w may be preset to a fixed value.

As another embodiment, the preset factor w may be preset so as to be increased as the gradient of the road on which the platooning group or the vehicle included in the platooning group is driven is increased.

The driving controller 40 may control driving of the vehicle included in the platooning group based on driving-speed-based fuel economy data of the vehicle included in the platooning group while maintaining the distance from the preceding vehicle within the set distance interval.

As an embodiment, the driving controller 40 may control the vehicle so as to be driven at the driving speed having the maximum fuel economy based on driving-speed-based fuel economy data of the vehicle included in the platooning group.

Particularly, in the case in which the driving speed of the vehicle included in the platooning group is higher than the driving speed of the preceding vehicle and the distance from the preceding vehicle approximates to the set separation distance d, the driving controller 40 may decelerate the vehicle included in the platooning group in order to maintain the distance from the preceding vehicle.

On the other hand, in the case in which the driving speed of the vehicle included in the platooning group is lower than the driving speed of the preceding vehicle and the distance from the preceding vehicle approximates to the product of the separation distance d and the preset factor w, the driving controller 40 may accelerate the vehicle included in the platooning group in order to maintain the distance from the preceding vehicle.

In controlling the vehicle included in the platooning group, therefore, the driving controller 40 may maintain the set distance from the preceding vehicle within the distance interval extended from the separation distance, whereby it is possible to improve the degree of freedom in vehicle speed. In particular, the driving controller 40 may control the vehicle so as to have the driving speed for improving the fuel economy thereof while maintaining the distance from the preceding vehicle within the distance interval.

A braking strategy setter 50 configured to set the speed profile of the vehicle included in the platooning group based on the target deceleration at the time of abrupt braking as braking strategy may be further included.

As an embodiment, the target deceleration may be preset and stored for each vehicle.

As another embodiment, the target deceleration may be calculated depending on the distance from the preceding vehicle or an obstacle and the driving speed of the vehicle. In particular, the target deceleration may be calculated such that the driving distance of the vehicle is less than the separation distance while deceleration is performed such that the speed relative to the preceding vehicle or the obstacle becomes 0.

A deceleration profile may be preset so as to be increased from the point in braking time over time in order to follow the preset target deceleration.

The braking strategy setter 50 may calculate compensated deceleration in which the gradient of the road on which the platooning group or the vehicle included in the platooning group is driven is reflected as target deceleration, and may set a speed profile based on the calculated compensated deceleration as braking strategy.

The braking strategy setter 50 may calculate compensated deceleration having deceleration based on the estimated gradient reflected in the target deceleration, and may determine the speed profile of the vehicle included in the platooning group over time at the time of braking based on the calculated compensated deceleration as braking strategy.

Slope deceleration a_θ may be calculated by reflecting an estimated gradient θ through the following equation.

$$a\_\theta = g*\cos(\theta)\ [m/s^2]$$

In particular, target deceleration a_ctr may be calculated by adding the slope deceleration a_θ having the estimated gradient θ reflected therein to target deceleration a_req on the flatland.

$$a\_ctr = a\_req + a\_\theta + \text{tolerance value}$$

Here, the tolerance value may be a value tuned for safety.

As another embodiment, the braking strategy setter 50 may calculate a required point in braking time based on a calculated time to collision TTC, may calculate a slope braking time based on the estimated gradient, and may determine vehicle braking strategy so as to reflect the slope braking time calculated at the calculated required point in braking time.

The time to collision TTC may be calculated through the following equation.

$$TTC = t\_col - t\_cur = d/V\_cur\ [sec]$$

Here, d indicates the separation distance between an obstacle and the vehicle, V_cur is a relative speed between the obstacle and the vehicle in the current state, t_col indicates an expected point in collision time, and t_cur indicates the current point in time.

The braking strategy setter 50 may determine the point in braking time using the vehicle braking strategy. The point in braking time may be determined to be a point in time at which it is sensed that collision with an obstacle is expected or a point in time thereafter.

Specifically, the required point in braking time may be calculated based on the calculated expected point in collision time TTC or the profile of the target deceleration a_req calculated based thereon.

More specifically, the profile of the target deceleration a_req may include required point in braking time. For example, in the profile of the target deceleration a_req, the required point in braking time may be set such that the magnitude of the maximum deceleration is equal to or less than a predetermined value.

That is, according to an embodiment, the braking strategy setter 50 may set the required point in braking time such that, in the profile of the target deceleration a_req, the magnitude of the maximum deceleration is equal to or less than a predetermined value.

In addition, the braking strategy setter 50 may calculate the slope braking time based on the estimated gradient. As an embodiment, the slope braking time may be preset at every estimated gradient θ. As another embodiment, the slope braking time may be calculated through an equation using the estimated gradient θ.

As an embodiment, the slope braking time may be calculated as a positive value for a downward slope gradient, may be calculated as a negative value for an upward slope gradient, and may be calculated such that the slope braking time is increased as the magnitude of the gradient is increased.

Figure 9:
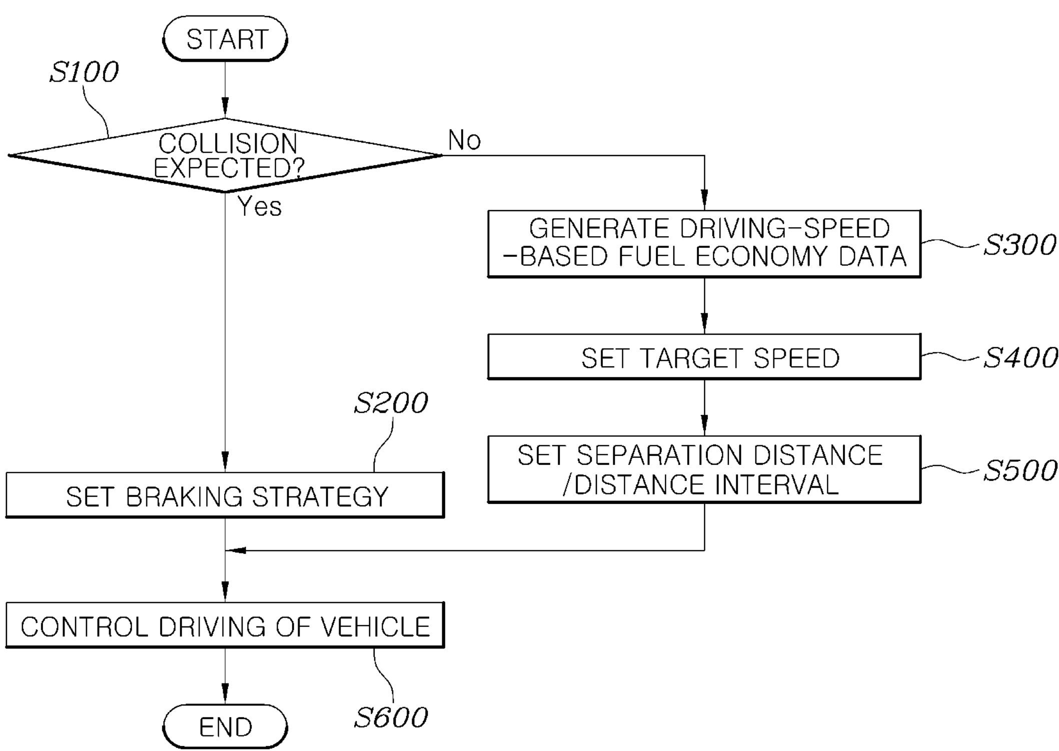
FIG. 9 is a flowchart showing a vehicle platooning control method according to an embodiment of the present invention.

FIG. 9 is a flowchart showing a vehicle platooning control method according to an embodiment of the present invention.

Referring to FIG. 9, the vehicle platooning control method includes a step (S400) of setting a target speed of a platooning group based on driving-speed-based fuel economy data of a vehicle included in the platooning group, a step (S500) of setting the separation distance between the vehicle included in the platooning group and the preceding vehicle based on the set target speed, and a step (S600) of controlling driving of the vehicle included in the platooning group based on the set target speed or the set separation distance.

In the step (S400) of setting the target speed of the platooning group, the driving speed of the platooning group having the maximum fuel economy may be set as the target speed of the platooning group using driving-speed-based fuel economy data of the vehicle included in the platooning group.

Before the step (S400) of setting the target speed of the platooning group, a step (S300) of monitoring driving data of the vehicle included in the platooning group and generating driving-speed-based fuel economy data based on the monitored driving data may be further included.

In the step (S500) of setting the separation distance from the preceding vehicle, the separation distance may be set based on the speed profile of each of the vehicle included in the platooning group driven at the target speed and the preceding vehicle at the time of abrupt braking.

In the step (S500) of setting the separation distance from the preceding vehicle, a distance interval including the separation distance may be set in an extended state based on the gradient of the road on which the platooning group or the vehicle included in the platooning group is driven. In the step of controlling driving of the vehicle included in the platooning group, driving of the vehicle included in the platooning group may be controlled based on the set distance interval.

In the step (S600) of controlling driving of the vehicle included in the platooning group, driving of the vehicle included in the platooning group may be controlled based on the driving-speed-based fuel economy data thereof while the distance from the preceding vehicle is maintained within the set distance interval.

In the step (S500) of setting the separation distance from the preceding vehicle, the distance interval may be set as an interval equal to or greater than the set separation distance and having the product or less of the separation distance and preset factor.

The preset factor may be preset so as to be increased as the gradient of the road on which the platooning group or the vehicle included in the platooning group is driven is increased.

Before the step (S600) of controlling driving of the vehicle included in the platooning group, a step (S200) of setting the speed profile of the vehicle included in the platooning group based on target deceleration at the time of abrupt braking as braking strategy may be further included. In the step (S600) of controlling driving of the vehicle included in the platooning group, driving of the vehicle may be controlled based on the set braking strategy.

In particular, before the step (S400) of setting the target speed of the platooning group, a step (S100) of determining whether front collision of the vehicle included in the platooning group is expected may be further included. Specifically, the front collision may be determined using a radar sensor, a lidar sensor, or a camera sensor provided in a leader vehicle of the platooning group to sense the front thereof.

Upon determining that front collision is expected (S100), the step (S200) of setting the braking strategy may be performed. Upon determining that the front collision is not expected (S100), the step (S400) of setting the target speed of the platooning group may be performed.

In the step (S200) of setting the braking strategy, compensated deceleration may be calculated by reflecting the gradient of the road on which the platooning group or the vehicle included in the platooning group is driven in the target deceleration, and a speed profile based on the calculated compensated deceleration may be set as the braking strategy.

A vehicle platooning control system and method described above may control the driving of a platooning group in consideration of speed-based fuel economy characteristics of each vehicle included in the platooning group, whereby it is possible to improve fuel economy of the platooning group.

In addition, the vehicle platooning control system and method may improve the degree of freedom in speed of each vehicle included in the platooning group on a sloped road, whereby it is possible to achieve driving capable of improving fuel economy of each vehicle.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A vehicle platooning control apparatus, comprising:

one or more processors configured to execute instructions stored in a memory, thereby configuring the one or more processors to:

set a target speed of a platooning group based on driving speed-based fuel economy data of vehicles included in the platooning group;

set a separation distance between a vehicle included in the platooning group and a preceding vehicle based on a distance it takes the vehicle to stop at a time of braking of the vehicle driven at the target speed and a distance it takes the preceding vehicle driven at the target speed to stop at a time of braking;

adjust the separation distance based on a gradient of a road on which the platooning group or the vehicle is driven, by setting a distance interval equal to or greater than the separation distance and equal to or less than a product of the separation distance and a preset factor that increases in response to the gradient;

control speed of the vehicle included in the platooning group to follow the target speed set based on the driving speed-based fuel economy data and to maintain the separation distance set based on the target speed, wherein the one or more processors are configured to sum multiple fuel economy data collected from the platooning group and set a driving speed having a maximum fuel economy as the target speed of the platooning group; and determine, at the target speed, a speed profile of the preceding vehicle and a speed profile of the vehicle included in the platooning group at a time of abrupt braking, wherein the speed profile of the vehicle included in the platooning group is set based on the target deceleration at the time of abrupt braking as a braking strategy, wherein compensated deceleration, in which the gradient of the road on which the platooning group or the vehicle included in the platooning group is driven, is reflected as target deceleration is calculated, and wherein the speed profile of the vehicle included in the platooning group is set based on the calculated compensated deceleration as the braking strategy, wherein slope deceleration a_θ is calculated by reflecting an estimated gradient θ through: a_θ=g*cos(θ), wherein target deceleration a_ctr is calculated by adding the slope deceleration a_θ having the estimated gradient θ reflected therein to target deceleration on the flatland a_req through: a_ctr=a_req+a_θ+tolerance value, and wherein the tolerance value is a value tuned for safety, to integrate each speed profile over time to obtain a stopping distance ($S_2$, $S_3$), and to set the separation distance (d) to satisfy $d \geq S_3 - S_2 + \alpha$, where $\alpha$ is a tuning parameter representing a safety margin to account for differences in stopping distances between the preceding vehicle and the vehicle included in the platooning group.

2. The vehicle platooning control apparatus according to claim 1, wherein the one or more processors are further configured to:

monitor driving data of the vehicles and generate the driving speed-based fuel economy data based on the monitored driving data.

3. The vehicle platooning control apparatus according to claim 1, wherein the one or more processors are further configured to:

control speed of the vehicle based on the driving speed-based fuel economy data of the vehicle while maintaining a distance from the preceding vehicle within the distance interval.

4. A processor-implemented vehicle platooning control method, the method comprising:

setting, by one or more processors, a target speed of a platooning group based on driving speed-based fuel economy data of vehicles included in the platooning group;

setting, by the one or more processors, a separation distance between a vehicle included in the platooning group and a preceding vehicle based on a distance it takes the vehicle to stop at a time of braking of the vehicle driven at the target speed and a distance it takes the preceding vehicle driven at the target speed to stop at a time of braking;

adjusting the separation distance based on a gradient of a road on which the platooning group or the vehicle is driven, by setting a distance interval equal to or greater than the separation distance and equal to or less than a product of the separation distance and a preset factor that increases in response to the gradient;

controlling, by the one or more processors, speed of the vehicle included in the platooning group to follow the target speed set based on the driving speed-based fuel economy data and to maintain the separation distance set based on the target speed; and determining, at the target speed, a speed profile of the preceding vehicle and a speed profile of the vehicle included in the platooning group at a time of abrupt braking, wherein the speed profile of the vehicle included in the platooning group is set based on the target deceleration at the time of abrupt braking as a braking strategy, wherein compensated deceleration, in which the gradient of the road on which the platooning group or the vehicle included in the platooning group is driven, is reflected as target deceleration is calculated, and the speed profile of the vehicle included in the platooning group is set based on the calculated compensated deceleration as the braking strategy, wherein slope deceleration a_θ is calculated by reflecting an estimated gradient θ through: a_θ=g*cos(θ), wherein target deceleration a_ctr is calculated by adding the slope deceleration a_θ having the estimated gradient θ reflected therein to target deceleration on the flatland a_req through: a_ctr=a_req+a_θ+tolerance value, and wherein the tolerance value is a value tuned for safety, to integrate each speed profile over time to obtain a stopping distance ($S_2$, $S_3$), and to set the separation distance (d) to satisfy $d \geq S_3 - S_2 + \alpha$, where $\alpha$ is a tuning parameter representing a safety margin to account for differences in stopping distances between the preceding vehicle and the vehicle included in the platooning group, wherein the setting of the target speed of the platooning group comprises summing multiple fuel economy data collected from the platooning group and setting a driving speed having a maximum fuel economy as the target speed of the platooning group.

5. The vehicle platooning control method according to claim 4, further comprising:

monitoring driving data of the vehicle and generating the driving speed-based fuel economy data based on the monitored driving data.

6. The vehicle platooning control method according to claim 4, wherein the controlling of the speed of the vehicle comprises:

controlling the speed of the vehicle based on the driving speed-based fuel economy data of the vehicle while a distance from the preceding vehicle is maintained within the distance interval.

* * * * *